(12) United States Patent
Jørgensen et al.

(10) Patent No.: US 8,198,742 B2
(45) Date of Patent: Jun. 12, 2012

(54) VARIABLE SPEED WIND TURBINE WITH A DOUBLY-FED INDUCTION GENERATOR AND ROTOR AND GRID INVERTERS THAT USE SCALAR CONTROLS

(75) Inventors: Allan Holm Jørgensen, Aalborg (DK); Lars Helle, Suldrup (DK); Leonard Schaier, Port Washington, NY (US)

(73) Assignee: Vestas Wind Systems A/S, Aarhus N, (DK)

( * ) Notice: Subject to any disclaimer, the term of this patent is extended or adjusted under 35 U.S.C. 154(b) by 657 days.

(21) Appl. No.: 12/336,219

(22) Filed: Dec. 16, 2008

(65) Prior Publication Data
US 2009/0206606 A1 Aug. 20, 2009

Related U.S. Application Data

(60) Provisional application No. 61/009,593, filed on Dec. 28, 2007.

(30) Foreign Application Priority Data

Feb. 28, 2008 (DK) .................................. 2008 00290

(51) Int. Cl.
*H02P 9/04* (2006.01)
*F03D 9/00* (2006.01)

(52) U.S. Cl. ............................................ 290/44; 322/44
(58) Field of Classification Search .................... 290/44, 290/55
See application file for complete search history.

(56) References Cited

U.S. PATENT DOCUMENTS

| 5,239,251 | A  | * | 8/1993  | Lauw ............................. 318/767 |
| 7,638,983 | B2 | * | 12/2009 | Park et al. ....................... 322/20 |
| 7,728,452 | B2 | * | 6/2010  | Arinaga et al. ................. 290/44 |
| 7,966,103 | B2 | * | 6/2011  | Jorgensen et al. ............ 700/297 |
| 8,049,352 | B2 | * | 11/2011 | Jorgensen et al. ............. 290/44 |
| 2004/0217595 | A1 | | 11/2004 | Feddersen et al. |
| 2008/0093854 | A1 | * | 4/2008  | Bucker et al. ................... 290/44 |

FOREIGN PATENT DOCUMENTS
WO WO2004/098261 11/2004

\* cited by examiner

*Primary Examiner* — Tulsidas C Patel
*Assistant Examiner* — Stefan Mikailoff
(74) *Attorney, Agent, or Firm* — Patterson & Sheridan, LLP (57) ABSTRACT

The present invention relates to an improved wind turbine, of the type which employs doubly fed induction generators (DFIG), and a wind park including the same, which permits the use of lighter weight turbines, with the ability to have greater energy capture, more precise control of asymmetrical phases and enhanced maintenance and support of the grid during fault conditions.

5 Claims, 9 Drawing Sheets

VARIABLE SPEED WIND TURBINE WITH A DOUBLY-FED INDUCTION GENERATOR AND ROTOR AND GRID INVERTERS THAT USE SCALAR CONTROLS

BACKGROUND OF THE INVENTION

1. Field of the Invention

The present invention relates to an improved wind turbine, of the type which employs doubly fed induction generators (DFIG), and a wind park including the same, which permits the use of lighter weight turbines, with the ability to have greater energy capture, more precise control of asymmetrical phases and enhanced maintenance and support of the grid during fault conditions.

Specifically, the present invention relates to wind turbines configured for operation either singly, in small concentrations, or in wind parks, each turbine being a variable speed turbine using a doubly fed induction generator (DFIG) with grid side inverters, having power provided from both their generator stators and rotors, and preferably with major contributions of reactive power for grid voltage support being provided by park level static reactive power sources. As well, the present invention contemplates the use of blade pitch control, which is used to facilitate staying connected with rotor blades maintained at or near their operational speeds before and during a fault.

2. Background of the Invention

A wind turbine converts kinetic energy from the wind into electrical energy for utility power grids. Wind energy is used to turn wind blades of a turbine rotor for rotating a rotor of an electrical generator, with the electricity being supplied to a utility grid.

The electrical power available from a wind driven generator and supplied to a utility grid is a function of the power available from the wind, its speed, losses in the grid and the characteristics of the distribution system and loads. Because wind speed fluctuates, the force applied to the rotor can vary. Power grids, however, require electrical power at a substantially constant voltage and frequency. Most electric power transmission components have a significant reactive component. Therefore voltages in the grid are also a function of the reactive characteristics of loads and components connected to the grid and to prevent damage to equipment, grid voltage must be held within certain tolerances.

A doubly-fed induction generator (DFIG) can supply real power and contribute to voltage control. How that is achieved depends upon whether the level of rotor current provided is greater or less than that needed to provide sufficient flux to generate rated output voltage. When excess current is applied to the rotor, the generator is considered to be overexcited. In this state more flux than necessary is generated by rotor current, the generator supplies or generates reactive power from the stator and, with regard to reactive power, acts like a capacitor. By convention, this type of reactive power is considered to be positive (flowing from the generator) and is typically labeled "+Q".

If the generator receives too little rotor current, it is considered to be underexcited. In this state it absorbs reactive power into the stator to help supply flux not provided by its rotor. By convention, reactive power absorbed into the stator is considered to be negative (flowing into the generator) and is typically labeled "−Q".

A generator's rating, and hence its frame size, is determined by its ability to deliver real and reactive power, and a key consideration relates to the potential adverse effect of heat generation. The ability to deliver real and positive reactive power (+Q) is dependent on rotor current. Rotor heating is directly proportional to the square of total rotor current ($I^2R$) and is therefore proportional to the vector sum of direct and quadrature components of the rotor current. The direct component of rotor current is responsible for generating flux while the quadrature component is responsible for producing torque and power. Rotor heating is also due to rotor core losses from excitation flux. Any increases in rotor current to increase reactive power generation therefore increases rotor heating. In doubly fed induction generators, there are therefore power output limits mandated by heating considerations.

Although absorption of reactive power does not increase rotor heating above what would be experienced by delivery of only real power, the increase in flux due to absorption of reactive power causes excess heating of end sections of a generator's stator. Therefore, there are also power output limits of DFIG systems due to stator end heating.

According to one aspect of the present invention, it is preferred that real power production is provided by the wind turbine generators and reactive power production/absorption is provided by park level Flexible Alternating Current Transmission Systems ("FACTS") and Static Synchronous Compensator ("STATCOM") like devices. As a consequence, lighter weight generators can be provided, while maintaining benefits unique to DFIG systems.

Among the benefits of a DFIG system, is its ability to capture energy over a wide speed range by use of rotor current control. Below synchronous speed, power is fed to the generator rotor at a frequency that is the difference between the rotational speed of the rotor and that of equivalent mechanical speed of the grid, allowing the DFIG to provide fixed frequency power from its stator. Above synchronous speed, power is withdrawn from the generator rotor at the appropriate frequency, again allowing the DFIG to provide fixed frequency power from its stator. Above synchronous speed, the power available from the rotor has often been directed into dissipative elements in prior art systems.

More recently, wind power has become a larger contributor of power to an electric grid and use of the power from the rotor as a resource for the grid, rather than having it dissipated, has become more desirable, particularly if the power is delivered to the grid via a DC link and a grid side inverter. Thus, power flow may be maintained even in the short interval when a rotor may not be controlling stator current, as may occur when a sudden drop of grid voltage causes demagnetization of a DFIG. Providing support to the grid through a grid inverter has the added benefit of reducing the load on dissipative elements in the rotor or DC link circuit that is created by the effects of demagnetization.

The present invention, through its use of a DC Link and active grid inverter in lieu of a passive rectifier not only provides support to the grid, but also provides a reduction in grid harmonics.

Moreover, the present invention, in its preferred system includes scalar rather than field oriented control (FOC) of rotor excitation. Control of rotor excitation can be accomplished in at least two ways, namely field oriented control or scalar control. FOC involves transforming AC signals representing three-phase generator stator output quantities in a fixed reference frame into parameters that are essentially fixed in a reference frame that rotates with a rotor flux vector and allows use of DC values. However, with FOC, otherwise useful information regarding the AC current in each phase is lost in the transformation process. FOC presupposes that the three phase AC currents are equal and sum to zero. Because in certain instances the AC signals are asymmetrical (that is, not equal), useful AC information may be lost during the transformation of AC signals from the stationary frame into a rotating frame.

As a consequence, FOC is unable to be used in a system that independently controls the electrical quantities (e.g., voltage, current) of each phase of the power grid. Theoretically, each phase of an ideal power grid should not vary. However, the electrical quantities on each phase of a wind turbine generator may vary due to transients on the grid which may cause uneven thermal stress, unbalanced mechanical forces and high DC link voltages. Accordingly, in a system in which control of rotor excitation is to be employed for grid control, it is desirable to correct for the asymmetry for at least the outputs of each of the three phase connections of a DFIG stator.

The present invention therefore incorporates as its preferred embodiment the use of scalar control for both the stator and grid inverter for the same reason: to provide independent phase parameter control. Two alternative scalar control configurations are described that provide for the desired individual phase control. These configurations are based on the use of conventional Proportional-Integral ("PI") controllers or Resonance PI controllers. Resonance PI controllers have the advantage of offering steady state error control similar to that achievable with conventional PI controllers in DC based controls but have superior performance compared to conventional PI controllers in AC based scalar controls. Both conventional PI controllers and Resonance PI controllers are suitable for use in scalar controllers however.

A Resonance PI controller typically includes at least one resonance term and has a substantially zero phase shift in the vicinity of the resonance. A main advantage of a Resonance PI controller is that it is well suited for tracking a sinusoidal reference or error signal to reduce steady state errors to substantially zero. A Resonance PI controller operates directly on an AC signal and needs no coordinate transformations to achieve the high steady state accuracies typical of conventional PI Controllers operating on DC signals. The Resonance PI controller is therefore suitable for scalar control of a variable speed doubly fed induction generator where rotor frequencies vary with slip and in a grid inverter where the AC signal is fixed at a grid frequency. One form of a PI Resonance Controller in Laplace transform notation is given as:

$$H_{RC}(S) = K_p + K_i \frac{2\omega_d S}{S^2 + 2\omega_d S + \omega_n^2}$$

In the equation above, parameters $K_p$ and $K_i$ are proportional gain and integral gain respectively, $\omega_n$ is the resonant frequency and $\omega_d$ is a dampening operating parameter used to describe the sharpness of the characteristic near the resonant frequency. For rotor current control, $\omega_n$ is a slip frequency that is variable and therefore tracked in a preferred embodiment while when used for control of the grid inverter $\omega_n$ is fixed at the grid frequency.

The DFIG system of the present invention is specifically adapted to stay connected to the grid during a fault and provide support to the grid. The grid support related to counteracting the effect of a fault is generally an effort to accomplish two objectives. The first is to help clear the fault and with the assistance of reactive power sources raise system voltages during the fault. The second is to minimize the amount of time required to place a wind turbine back on line generating power after the fault condition has been addressed.

Although it seems counterintuitive, it is advantageous for affected wind turbines to continue to provide output current at substantially the same magnitude as that which was present prior to the fault and not reduce it. A normative output current is better able to actuate the protective devices (such as circuit breakers) and therefore potentially shorten the time to isolate a fault.

The grid support required often varies, depending upon the requirements of the grid as set forth in Grid Codes. Grid Codes around the world require different behavior during a low voltage grid fault. Some require full reactive current and as much active current as possible during the grid disturbance. Others prioritize the active current. Although it would be desirable to be able to maximize real and reactive current at the same time, component heating, whether of the rotor of a DFIG or the current carrying elements of a partial or full converter, is a function of both the real and reactive components of the current being carried. Therefore if it is desired to maximize real current, then the reactive current component must be minimized. Likewise if reactive current were to be maximized, then the real current component of the total must be minimized.

The present invention in one of its preferred forms has among its advantages, the ability to maximize both the reactive and real current components available from a wind turbine or grouping of wind turbines, by providing a system which permits the use of a separate reactive power supply to handle reactive current requirements during a fault with the wind turbines therefore able to maximize real power. As a consequence, the wind turbine generators can be made smaller, with an attendant savings in size, weight and cost.

Staying connected during fault conditions can have adverse consequences to mechanical components as well. If power load on a wind turbine is reduced, as it is in a low voltage fault condition, the blades of the turbine could accelerate and damage may occur. Nevertheless, there is a significant benefit in permitting the wind turbine rotor to be kept running at or near the pre-fault speed, so the generator can be more rapidly be operational when the fault is cleared.

To this end, according to another aspect of the present invention, rotor speed control is maintained by setting the blade pitch angle to a value that balances power load presented to the rotor by mechanical and electrical loads during the fault.

A variable speed wind turbine extracts the maximum it can from the wind when the blade tip speed to wind speed ratio is a constant at or near the particular design value for the particular wind turbine design. Stated differently, as the wind speed increases, the rotational speed of the generator increases and brings it closer to the upper speed limit of the rotor and generator, and therefore it is not possible to operate a wind turbine at its optimum blade tip-wind speed ratio over the whole wind speed range.

In the mid- to upper-speed range, which is the range at which the wind turbine is most efficient, the blade tip to wind speed ratio is held constant by balancing the power output from the system to that available from the wind. That is, the power commanded by the wind turbine is derived from knowledge of the wind speed and is set to that value.

At higher wind speeds the wind turbine operates at its optimum blade tip to wind speed ratio (typically in the range of about 6 to 10) because to keep the ratio constant would require a rotational speed for the generator that would exceed its limits. Therefore when wind speed increases to its nominal speed, and further increases could drive the generator into an unsafe speed range, a generator speed reference is clamped to the nominal speed point. If wind speed increases further, the commanded power output is limited to a fixed value and blade pitch is varied to keep the power taken from the wind equal to the power necessary to keep the wind turbine rotor, and hence maintain the generator at its nominal speed.

In the case of higher wind speed (as in the case of the lower speed range as well), there must be a balance between power captured by a rotor system and the power outputted from the turbine plus losses in the various wind turbine systems. However, a difference between operation in these ranges is that in the optimum speed range, the blades are set to extract as much power as available, while in the higher speed range the blades' pitches are set to take just enough power to meet the value commanded for full power which is less than what is actually available in the wind.

When either balance is disturbed, as in the case of a sudden low voltage fault or power error, the known practice is to use a rapid blade pitch change to a no acceleration pitch angle (NOA) followed by shutdown to prevent equipment damage due to over currents and overspeed conditions. According to another aspect of the present invention, a rapid change of the pitch angle to the NOA angle to prevent overspeed is enhanced by the added capability of pitch control during the fault.

SUMMARY OF THE INVENTION

The present invention therefore discloses a variable speed wind turbine, and a method for operating such a variable speed wind turbine, adapted for use in a wind farm environment. The variable speed wind turbine includes a DFIG providing power from its stator to a utility grid without undergoing power transformations and back-to-back inverters for processing and otherwise controlling power to and from the DFIG rotor. The present invention also includes a DC link for isolating the back-to-back inverters, scalar control to provide more precise control of individual stator electrical quantities fed to the power grid; and subsystems to ameliorate the effects of low voltage faults.

The present invention supplies power to the grid at a substantially fixed power factor of unity, with power factor and or reactive power support being made at the substation or some other point either external of the DFIG system or as a separate reactive power support such as through switched capacitors mounted within a wind turbine. Moreover, the present invention feeds back any output reactive power to proactively force reactive power to zero and a Unity Power Factor.

The system also preferably provides blade pitch control during a low voltage condition. Feed forward control based on a power error is used to pitch the turbine blades to a low pitch angle and the blade pitch control is based on actual output power during a fault is then used to maintain blade rotational speed at substantially the same value during the fault as it was before the fault.

As well, graduated protection of the DC link and associated inverters components is provided. The output inverters thus continuously load the DC link even though a fault is occurring, while DC Choppers across the link and a Crowbar across the rotor are available to reduce the effects of a low voltage fault, helping keep the wind turbine connected and providing power to the grid. To ensure operation of the grid inverter and other subsystems at very low fault voltages a UPS is used to supply the auxiliary power to the subsystems, during normal and fault situations.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings.

The accompanying drawings, which are incorporated in, and constitute a part of, this specification illustrate implementations of the invention and, together with the description, serve to explain the principles of the invention. In the drawings.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE PRESENTLY PREFERRED EMBODIMENTS

Reference will now be made in detail to embodiments of the invention, examples of which are illustrated in the accompanying drawings. Wherever possible, the same reference numbers will be used throughout the drawings to refer to the same or like parts.

Figure 1:
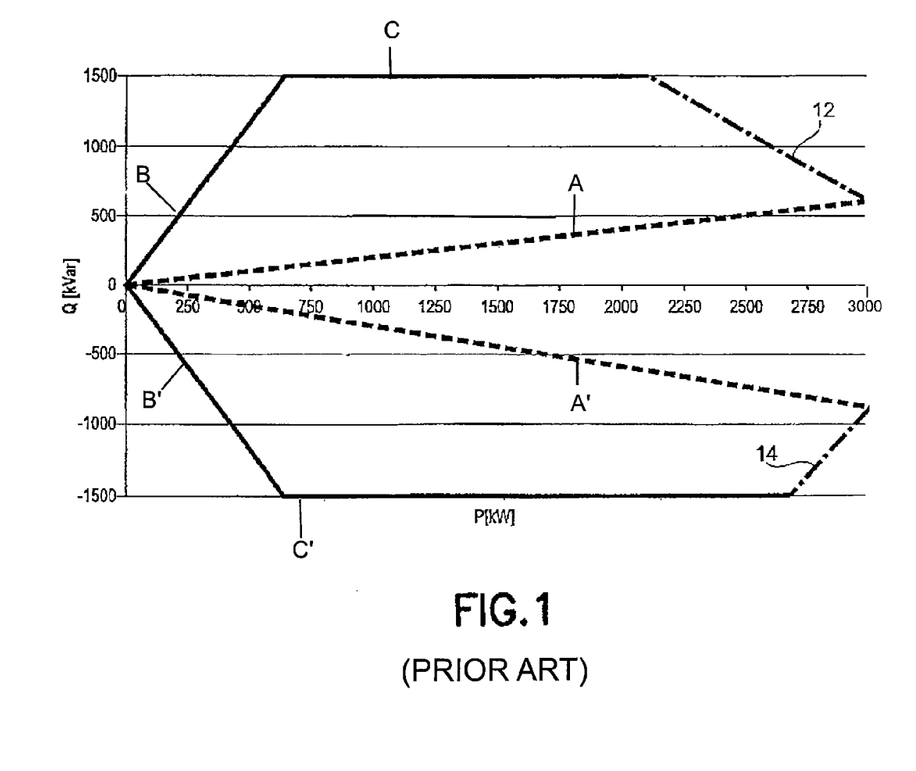
FIG. 1 illustrates the general characteristics of a prior art DFIG.

FIG. 1 describes power output limits of a known DFIG, with line 12 showing the output limits due to rotor heating and line 14 showing output limits due to stator end heating. That is, in order to produce more reactive power (Q) when the reactive power corresponds to a power factor of 0.98 (labeled as Line A) due to thermal limits of the generator rotor circuit (shown by Lines B and C) and when the DFIG is operating at full power (i.e., 3000 kW) the active power (P) must be limited as shown by line 12. Similarly, to absorb more reactive power when the thermal limit of the stator (shown by Lines B' and C') is defined by a power factor of 0.96 (labeled as Line A'), the active power must be reduced as shown by line 14.

Figure 2:
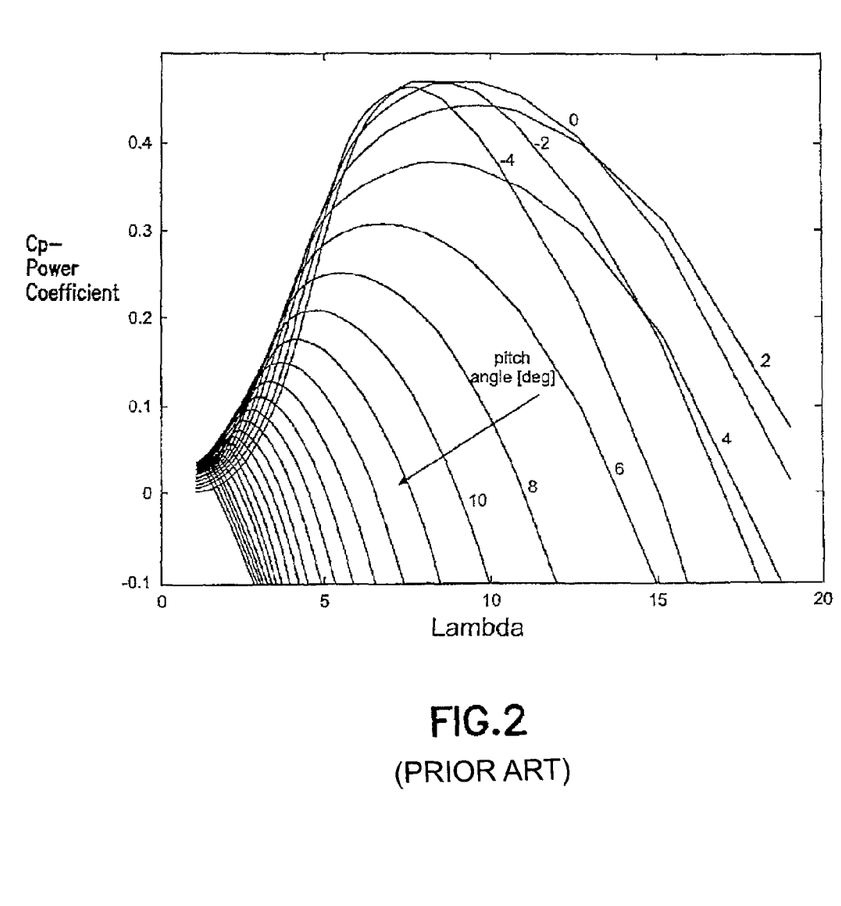
FIG. 2 illustrates $c_p$ curves for a prior art wind turbine.

FIG. 2 illustrates the $c_p$ curves which have been previously described and illustrate curves as a function of blade pitch angles and blade tip to wind speed ratio (lambda).

In general, the power captured by a wind turbine rotor blade system is derived from:

$$P_{el} = \frac{\eta \rho}{2} \pi R^2 c_p v^3, \quad \text{[Eq. 1]}$$

where η is an efficiency factor, dependent upon the efficiency of the generator, gearbox, etc. and ρ is air density, which is about 1.225 kg/m³ at sea level; R is rotor radius in meters, $c_p$ is the fraction of power extracted from the wind, and v is the wind velocity in meters/second.

A prior art set of $c_p$ curves as a function of blade pitch angles and blade tip to wind speed ratio (lambda) are shown in FIG. 2. As illustrated in FIG. 2, each different blade pitch angle curve has a different blade tip to wind speed ratio at which $c_p$ is a maximum. A plot of the blade pitch angle versus blade tip to wind speed ratio at each of the maximum $c_p$ points therefore yields the blade pitch angle that will allow extraction of maximum available power at each lambda. As one skilled in the art would recognize from the example in FIG. 2, the maximum power in the wind will be extracted if the tip to wind speed ratio is in the ratio of about 6 to 10.

For a given wind turbine design, Eq. 1 calculates the actual electrical output of a wind turbine when both $c_p$, which is a function of blade pitch angle, and v are known.

Likewise, the same constituents of Eq. 1 can be used for calculating $c_p$ rather than $P_{el}$, as follows:

$$c_p = \frac{2P_{el}}{\eta \rho \pi R^2 v^3}, \quad \text{[Eq. 2]}$$

Eq. 2 therefore gives the power coefficient value needed to extract from a wind at velocity v, an electrical value of $P_{el}$, as a function of lambda.

The present invention utilizes the information in FIG. 2, Eq. 1 and Eq. 2 in two ways. First it is used to calculate a no acceleration pitch angle based on known stored levels of power consumed by residual loads and other losses in subsystems of the wind turbine. Secondly the information is used to calculate blade pitch angles based on system output power during a low voltage fault.

Figure 3:
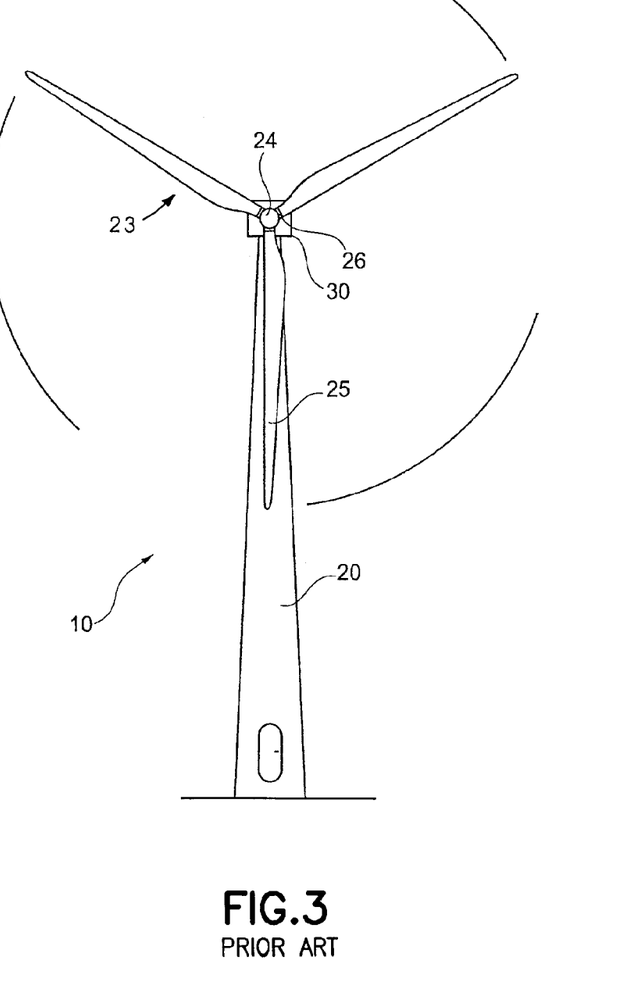
FIG. 3 illustrates a prior art wind turbine showing major mechanical elements.

As graphically shown in FIG. 3, a Wind Turbine 10 is supported on a Tower 20 and a Wind Turbine Nacelle 30 is positioned on top of the tower. As illustrated, Wind Turbine Rotor 23 has three Wind Turbine Blades 25 connected to the Hub 24 through three Pitch Mechanisms 26. Each Pitch Mechanism 26 includes a blade bearing and pitch actuating means which allows each blade to be pitched. The pitch process is controlled by a Pitch Controller. Details of the blade bearings, pitch actuating means and Pitch Controller are well known and not shown. Mechanical power from the wind is transferred from Hub 24 to a step up Gearbox (not shown) and then to Generator Shaft 111 shown in FIG. 5.

Figure 4:
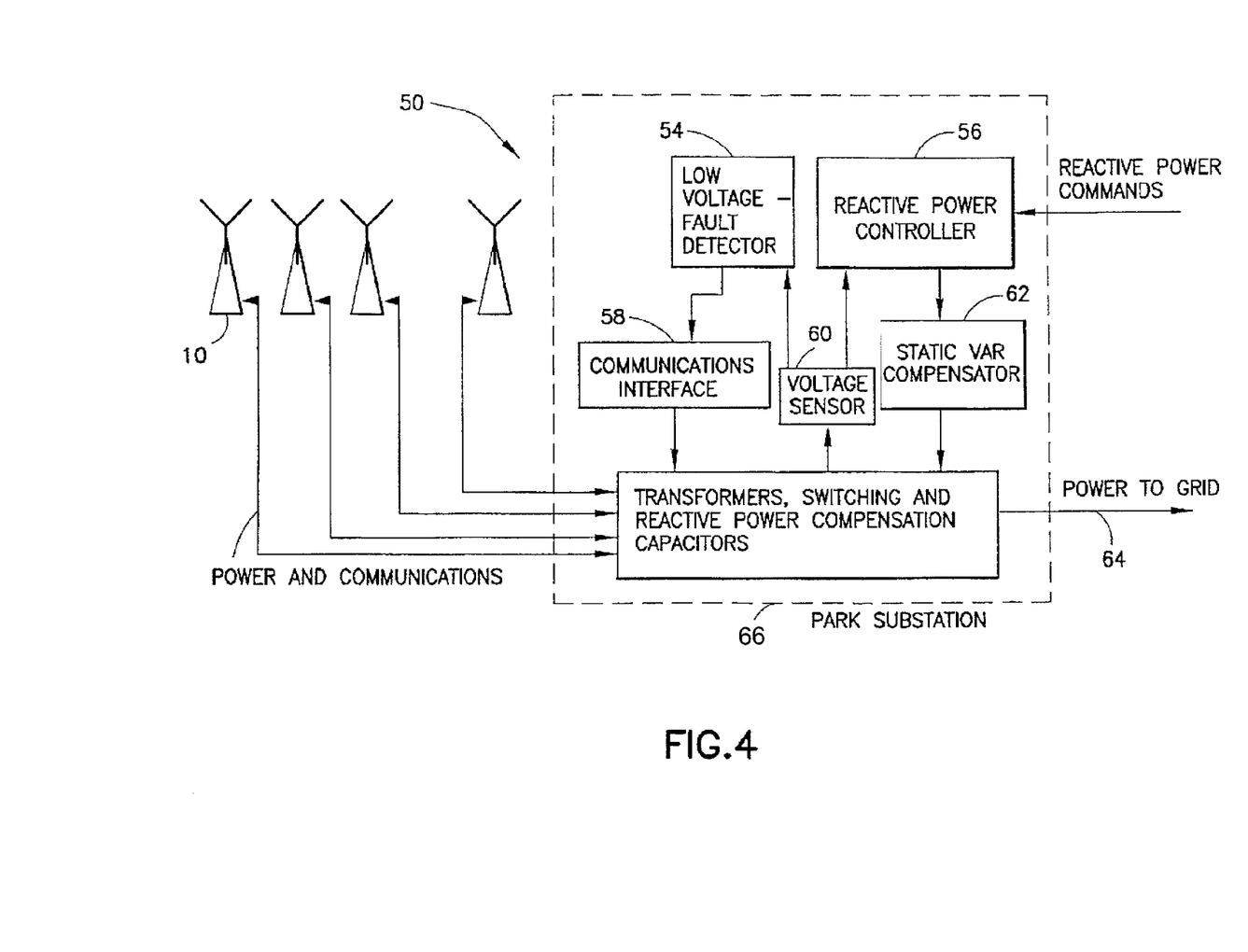
FIG. 4 illustrates a group of wind turbine of the present invention integrated into a wind farm.

Referring to FIG. 4, a number of Wind Turbines 10 are located in a Wind Park 50 having a Park Substation 66, which according to a preferred system includes a Static VAR Compensator 62 for providing substantially all reactive power from Wind Park 50 needed to support grid voltage control and any other reactive power needs of the grid. Power from Park 50 to the grid passes via Point of Common connection PCC 64. Substation 66 also includes Low Voltage Fault Detector 54, Voltage Sensor 60 and Reactive Power Controller 56. Under normal conditions Reactive Power Controller 56 operates in a commanded reactive power mode whereby reactive power output is responsive to Voltage Sensor 60 and grid voltage conditions around nominal voltage as well as to reactive power (or power factor) commands from a system operator. Under low voltage conditions fault Static VAR Compensator 62 controls reactive current to a preset or commanded value. Alternatively, Static VAR Compensator 62 controls its output reactive current as a predetermined function of voltage at PCC 64.

Figure 6:
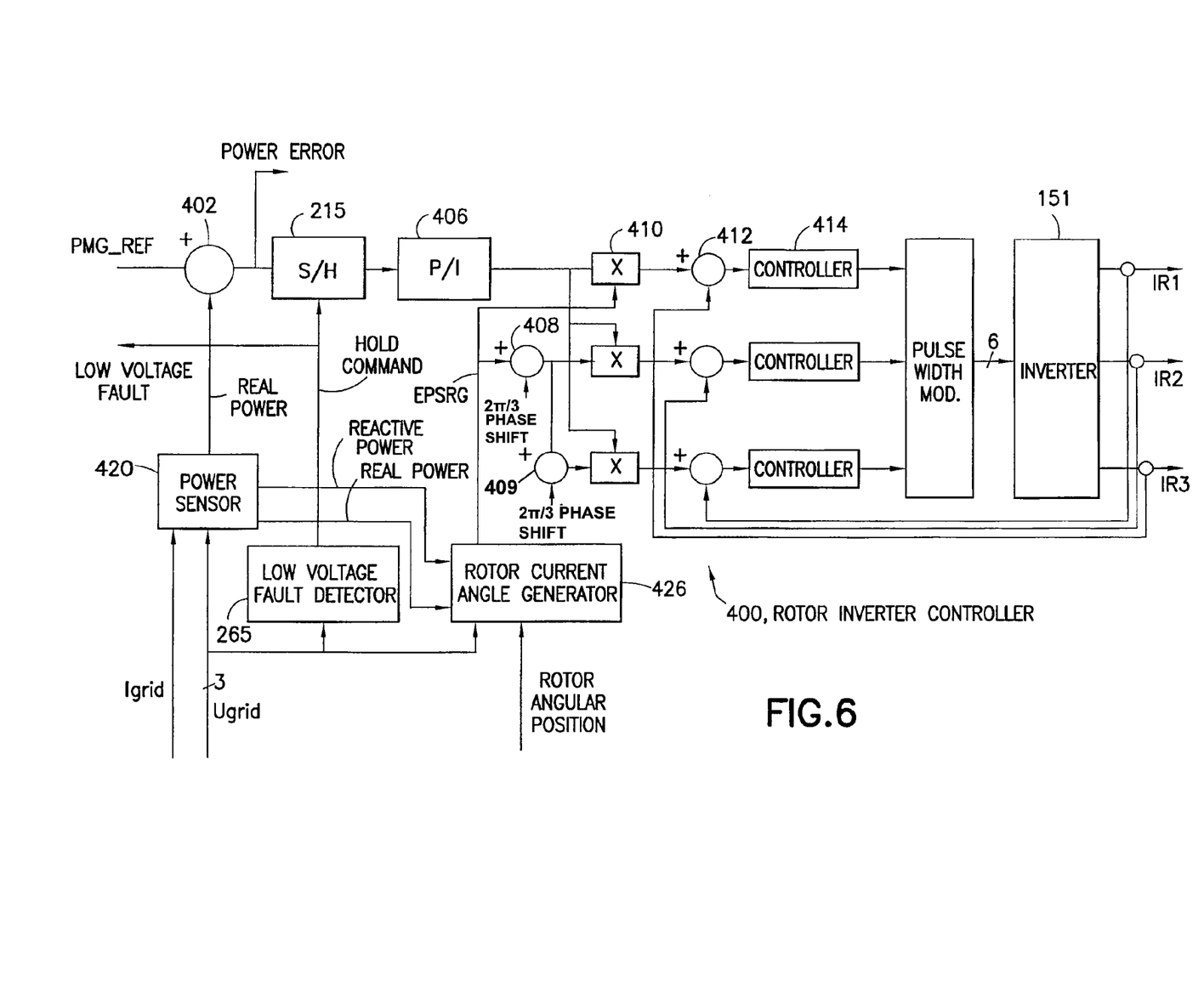
FIG. 6 illustrates an internal block diagram of rotor inverter controller of the present invention.

A low voltage fault is intended to mean a voltage that falls below a value and stays below that value for longer than about 40-100 milliseconds. When a fault is detected by Low Voltage Fault Detector 54 of FIG. 4, (or locally at each turbine 10) a signal is sent to Sample and Hold ("S/H") 215 of FIG. 6 and S/H 315 of FIG. 8 to hold both stator current and blade tip to wind speed ratio (lambda) at their pre-fault values. Likewise Reactive Power Controller 56 switches Static VAR Compensator 62 from a controlled reactive power mode to a constant/controlled current mode. Power Error from Rotor Inverter Controller 400, which is sensed before S/H 215 in FIG. 6 is fed to Rotor Reference Generator 300 to set blade pitch to a pitch out condition for a short period during the initial stage of the fault when demagnetization of the Generator may occur and Rotor Inverter Controller 400 may not have control of rotor current.

In the preferred embodiment, Low Voltage Fault Detector 54 operates independently of Low Voltage Fault Detector 265 (see FIG. 6), although if the communication between substation and individual turbine is fast enough, Low Voltage Fault Detector 54 can provide a command via Communication Interface 58 to each Wind Turbine 10 to enter into a low voltage fault mode.

Figure 5:
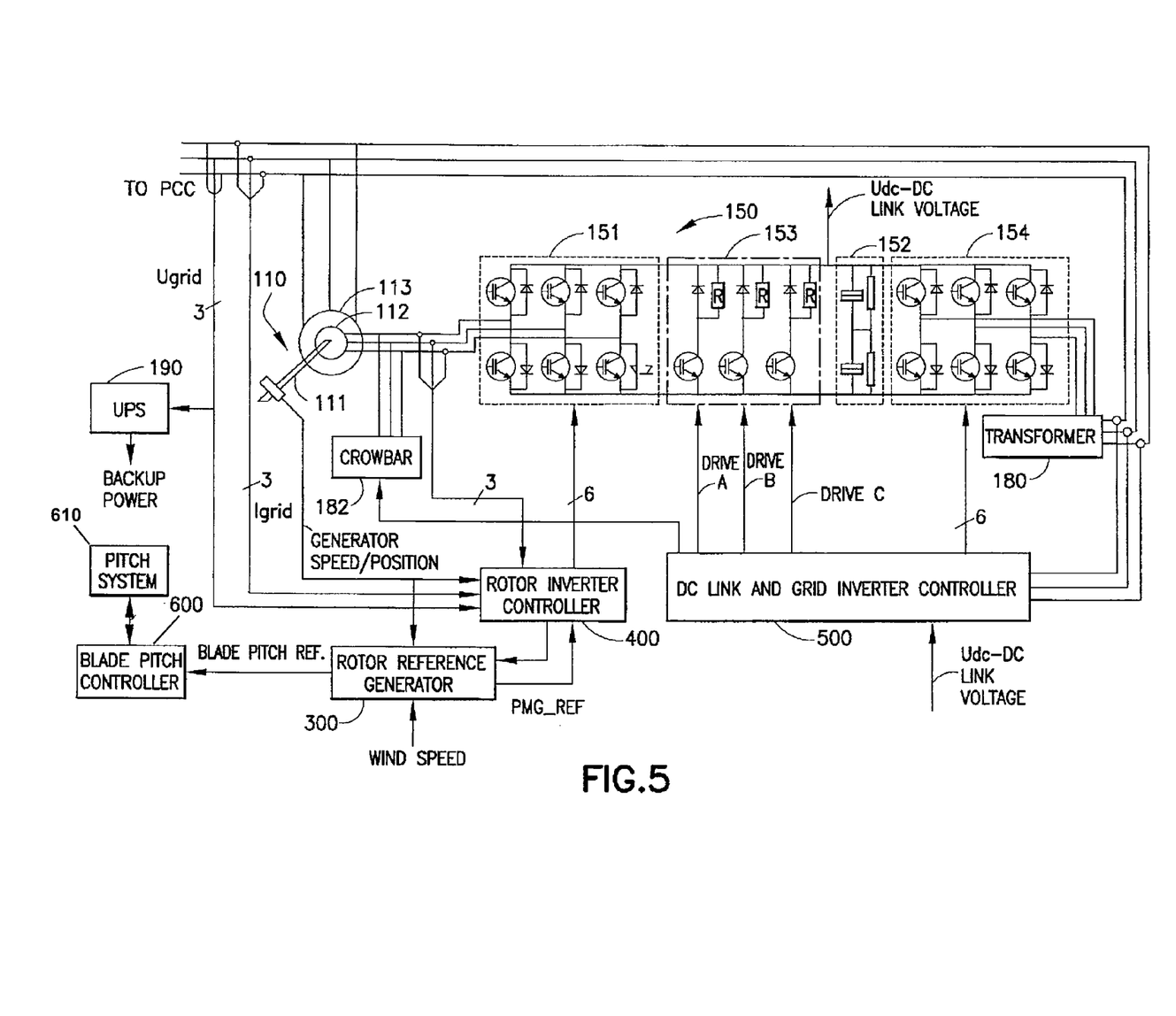
FIG. 5 is a block diagram showing the major power producing and control elements of the present invention.

FIG. 5 illustrates a block diagram of the power producing and control components of a preferred embodiment for a Wind Turbine 10 of the present invention. Wind Turbine 10 includes a doubly fed induction Generator 110 having a Stator 113 and a Rotor 112 connected to a Rotor Shaft 111 which is driven by a gearbox as previously discussed. Rotor 112 and Stator 113 each include four-pole, 3 phase windings to generate electric power from rotation of Rotor Shaft 111. Generator 110 supplies power from its stator at a fixed frequency and unity power factor to a grid at PCC 64 of FIG. 4. When Generator 110 runs above synchronous speed, it also supplies power from Rotor 112 to the grid at fixed frequency and unity power factor. As illustrated, the grid frequency is 60 Hertz and synchronous speed is 1800 RPM. Wind Turbine 10 also includes UPS 190 shown in FIG. 5 to provide backup power to control circuits and subsystems during normal and fault conditions and thus permit continued power output during a severe fault where grid voltage is insufficient.

The Wind Turbine 10 includes Rotor Link 150 which comprises self commutated Rotor Inverter 151, self commutated Grid Inverter 154, DC Link 152, and DC Chopper 153. DC Link 152 may include a series-parallel combination of capacitors or other energy storage elements such as batteries or superconducting devices. In a preferred embodiment using capacitors, resistors are used to assure equal voltages across series capacitors. Rotor Inverter 151 receives gate control signals from Rotor Inverter Controller 400 while Grid Inverter 154 receives gate control signals from DC Link and Grid Inverter Controller 500. DC Link and Grid Inverter Controller 500 also provides Drive A, B and C signals for Chopper 153 as well as control signals for Crowbar 182. Signals for control of the Crowbar 182 and Chopper 153 are based on $U_{dc}$ which is the DC voltage at the top of storage elements at DC Link 152.

Chopper 153 and Crowbar 182 limit voltage at DC Link 152 (therefore across the solid state device in Rotor inverter 151 and Grid Inverter 154) due to high levels as a result of sudden low voltage events or unbalanced stator line currents. DC Chopper 153 includes active switches to provide control that allows it turn on and off as required to maintain or otherwise regulate the voltage at the DC link 152 under high rotor current or unbalanced line current conditions for example. In a preferred embodiment, DC Chopper 153 is shown with three sections, driven by Drive A, Drive B and Drive C from Chopper Controller 504 of DC Link and Grid Inverter Controller 500 shown in greater detail in FIG. 7. While three chopper sections are shown in FIG. 5, any number of sections may be activated to accommodate more or less severe faults or voltage levels. Crowbar 182 operates in a similar manner using a bridge rectifier to feed a fixed resistor that is activated by a gate turn on-off device such as an insulated gate bipolar transistor ("IGBT") device triggered by Crowbar Controller 542 in FIG. 7.

Figure 7:
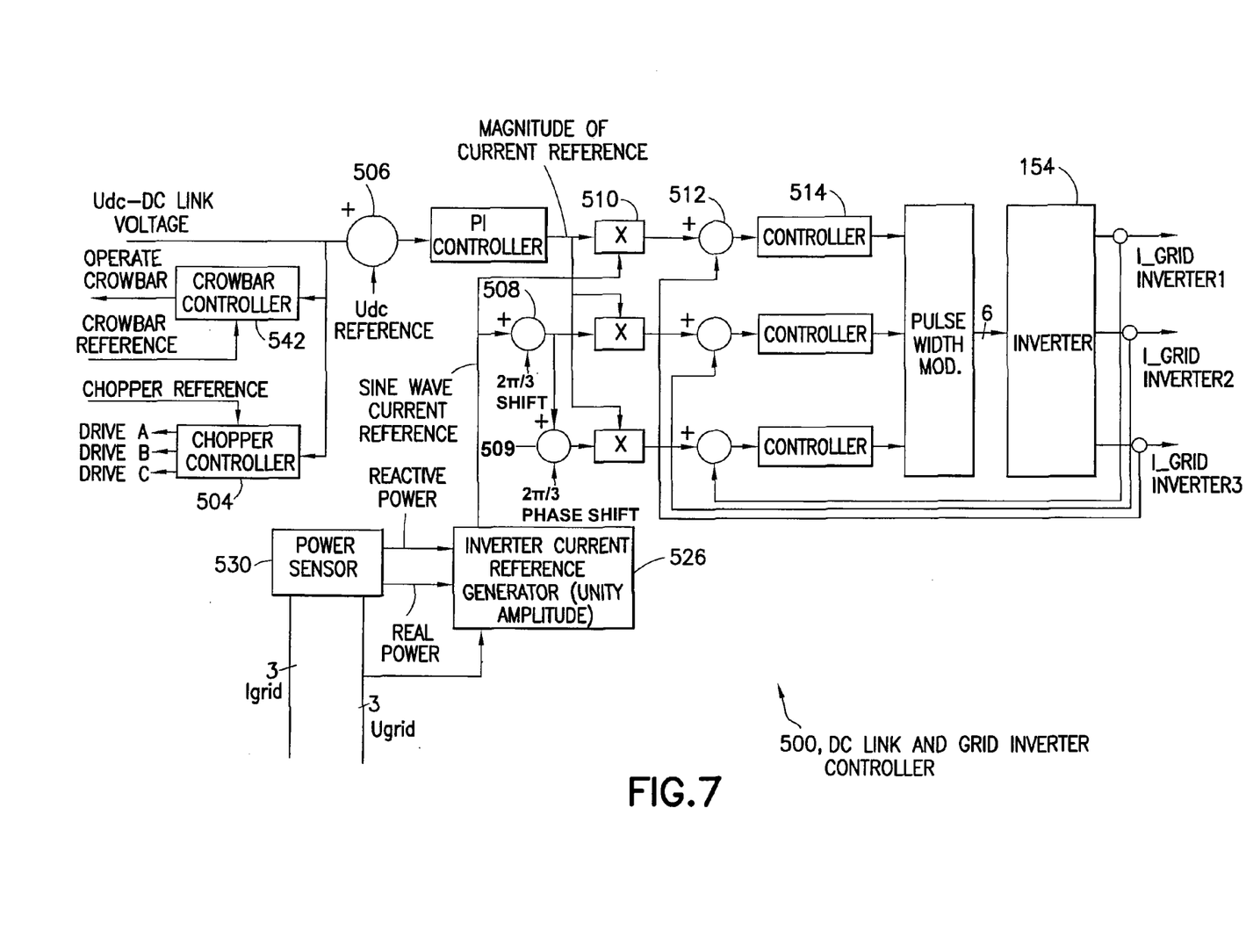
FIG. 7 provides a block diagram of the DC Link and Grid Inverter Converter of the present invention.

Referring to FIG. 7, Controllers 504 and 542 have independent voltage set points selected to coordinate operations for varying degrees of DC Link over voltage protection and levels. In a preferred embodiment, a voltage setting to trigger Chopper Controller 504 (Chopper Reference) is greater than nominal value for voltage at DC Link 152, Chopper Controller 504 may activate only a portion of Chopper 153 by applying pulsed signals at a high frequency to Drive A output and if the voltage continues to rise to Drive B output and then to Drive C as required. In an alternate embodiment all choppers are turned on at the same time and duty cycle of Drive A, B and C are changed in lieu of or in addition to adding sections loads to regulate the load presented by DC Chopper 153 to dissipate power from DC Link 152.

Crowbar 182 in FIG. 5 is activated if the voltage at DC Link 152 can no longer be controlled by the load presented by Grid Inverter 154 and Choppers of DC Chopper 153 and therefore exceeds Crowbar Reference in FIG. 7.

The Rotor Inverter 151 and Grid Inverter 154 include active components or switches in a three-phase bridge configuration. In one embodiment, the active switches are IGBT's and, in the case of Rotor Inverter 151, have conventional diodes to allow current to flow around the IGBT's in Rotor inverter 151 if Rotor Inverter 151 is turned off or Rotor currents would damage the IGBT's in the Rotor Inverter 151. In alternate embodiments where it may be practical to increase ratings of the existing conventional diodes across IGBT's of Rotor Inverter 151, crowbar functionality of Crowbar 182 may be provided by an additional chopper section.

Grid Inverter 154 is coupled to the grid via Power Transformer 180 and the output combined with output from Stator 113.

Turbine 10 includes a Rotor Inverter Controller 400 coupled to Rotor Inverter 151 of Rotor Link 150 to control the rotor currents in generator 110 and therefore the output of Stator 113 and power flow to and from Rotor 112 and DC Link 152. Like wise DC Link and Grid Inverter Controller 500 controls active components in Grid Inverter 154 to control power to and from DC Link 152 to the grid at PCC 64. Power that originates from Stator 113 and Rotor 112 are supplied to the grid at a fixed voltage, frequency and unity power factor at PCC 64. Power is supplied from Stator 113 at all suitable speeds above and below synchronous speed and from Stator 113 and Rotor 112 when Generator 110 is running above synchronous speed.

Rotor Inverter Controller 400 of FIG. 6 of the present invention preferably employs pulse width modulated (PWM) current regulation techniques to selectively control the active switches in Rotor Inverter 151 (shown for convenience in both FIG. 5 and FIG. 6) under Scalar Control. While Field Oriented Control or vector control may be used in alternate embodiments, Scalar Control provides for individual and/or independent control for each phase of Rotor 112 and hence Stator 113, while FOC does not allow independent phase control.

The preferred embedment of scalar control uses conventional PI controllers. An alternate embodiment of scalar control uses Resonance PI controllers. Both controllers allow for independent control of stator phase currents or inverter output current when employed in an inverter. Conventional PI controllers are simpler to implement, but Resonance PI controllers have improved steady state error performance over conventional PI controllers in AC applications using scalar control.

The scalar control of Rotor Inverter 151 is performed in Rotor Inverter Controller 400 using input signals such as rotor position to generate rotor speed and to synchronize the rotor signals to the grid, grid voltage $U_{grid}$, grid current $I_{grid}$, and measured rotor current values $I_{rotor}$, for each phase of Rotor 112 (IR1, IR2, IR3). Rotor Controller 400 also uses a sample of $U_{grid}$ to generate a signal indicating the operating frequency of the grid. These input signals and the calculated grid frequency signal allow Rotor Inverter Controller 400 to control power to the grid from Stator 113 without performing coordinate transformations of AC signals. This allows precise control of electrical quantities for each phase of Stator generated power because information regarding each phase of the grid is maintained.

Referring to FIG. 6, Rotor Inverter Controller 400 includes controls for Rotor Inverter 151 which controls power flow to and from Rotor 112 and DC Link 152, Control of currents in Rotor 112 by Rotor Inverter Controller 400 involves two loops. An outer loop including Error Detector 402 compares a signal PMG_ref from Rotor Reference Generator 300 in FIG. 8 to actual real output power calculated in Power Sensor 420. The output from Error Detector 402 is then used as a reference input to an inner loop that seeks to control rotor parameters and hence stator parameters so that power output from Wind Turbine 10 tracks the PMG_ref value.

The output error signal from Error Detector 402 is fed to Rotor Reference Generator 300 to initiate a pitch out condition in cases of excessive error at the output of Error Detector 402 and also to S/H 215. S/H 215 holds the last value before a low voltage condition and therefore permits a commanded output current equal to the output current value before the low voltage fault to be provided during a fault. Storage of the last value of the difference between PGM_ref (which is the commanded power as calculated in FIG. 8 and output from switch 330) and actual output power is preferably initiated by Low Voltage Fault Detector 265. It should be noted that while a real power output is commanded through PGM_ref., there is no commanded value of output reactive power. Rather, undesired reactive power output is fed back from Power Sensor 420 to proactively suppress any output reactive power from Stator 113.

The output of S/H 215 is fed to Power to Current (P/I) converter 406 and then to each input of Multipliers 410 and the outputs of each Multiplier 410 become reference currents for each of Error Detector 412. The other input to each Multiplier 410 is a sine wave at the rotor slip frequency as established by samples of Ugrid and Rotor Angular position sensor inputs to Rotor Current Reference Generator 426, having unity amplitude and at respective phase angles of σ, σ−120 (2π/3) and σ−240 (4π/3) degrees, where the 2π/3 and 4π/3 phase shifts are provided by Adder 408 and Adder 409. Phase angle σ is found in Current Reference Generator 426 by finding the angle whose tangent is real power output of Wind Turbine 10 divided by any reactive power from Wind Turbine 10. Real and Reactive power output, if any, are determined in block 420.

As noted, outputs of each Multiplier 410 become reference currents for each of Error Detectors 412. These reference currents are compared to corresponding output currents IR1, IR2 and IR3 and any errors are fed to Controllers 414. In a preferred embodiment Controllers 414 are each conventional PI controllers, but in an alternate embodiment are Resonance PI controllers.

At high wind speeds, Turbine 10 may operate at above synchronous speed such that power flow through Link 150 is reversed. In this case, power is provided by Rotor 112 and fed into the Rotor Link 150. The Rotor Inverter 151 acts as a rectifier, converting power generated from Rotor 112 of Generator 110 into a DC voltage, which is placed on the DC Link 152. If there is no fault on the grid and DC link voltage remains at a safe value, the active switches of DC Chopper 153 will remain off. Grid Inverter 154 then acts as an inverter, converting the power fed to DC Link 152 into AC power matching the characteristics of the grid. This power is then supplied to the grid. In both cases, i.e., when operating either under or over synchronous speed, the rotor inverter 151 is switched to operate at a frequency to generate rotor currents that are at the proper phase and frequency to control stator currents at the grid frequency and at a phase angle that results in stator output power at substantially unity power factor.

Turning next to the operation of the DC Link 152 below and above synchronous speed, the DC Link 152 stores a substantially constant DC voltage and in accordance with the present invention, the DC voltage remains substantially constant. Above synchronous speed, the voltage on DC link 152 attempts to increase because power generated from Rotor 112 charges DC link 152. However DC Link and Grid Inverter Controller 500 maintains the link voltage substantially constant by feeding to the grid excess power generated by Rotor 112. Likewise below synchronous speed DC Link and Grid Controller 500 increases the charge on the DC link by supplying power from the grid. The use of self-commutated Grid Inverter 154 as a controlled rectifier in under synchronous speed conditions reduces harmonic distortion on the grid.

Under normal grid voltage conditions and balanced three phase output currents from Stator 113 the chopper gate drivers of Chopper Controller 504 do not signal switches of DC Chopper 153 to turn on and DC Chopper 153 acts as an open circuit. The power either flows from grid inverter to rotor inverter, below synchronous speed or from rotor inverter to grid inverter, above synchronous speed.

We next consider the operation of the system in the event of a fault on the grid. When the presence of a low voltage fault appears at the PCC 64 of Wind Farm 50, stator voltages will drop causing demagnetization of Generator 110 and which leads to large currents at Stator 113 and Rotor 112 and to high voltages at Rotor 112. Energy is transposed from the rotor circuit to the DC Link 152. Large and fast energy transitions may occur, making it difficult for the Rotor Link 150 to maintain a constant DC voltage. To allow the Rotor Link 150 to remain in operation during such a grid fault condition, the DC chopper circuit arrangement includes a resistor that can be controlled by means of a high-speed switch, allowing excess power to be taken over in the short term by means of the additional resistor. The DC chopper circuit will act also to smooth the DC link voltage during periods of phase current imbalances.

Referring to FIG. 7, DC Link and Grid Inverter Controller 500 includes controls for Inverter 154, which controls power flow to and from DC Link 152. As illustrated, control of currents to and from DC Link 152 involves two loops. An outer loop including Error Detector 506 in FIG. 7 maintains a fixed DC link voltage under normal grid voltage conditions while an inner loop comprising Error Detectors at 512 operate to maintain output currents from Grid Inverter 154 as scaled replicas of reference values from the outputs of multipliers 510 at the frequency of the grid and having a unity power factor.

Error Detector 506 receives a signal representing the voltage $U_{dc}$ at DC Link 152 and a signal representing a target or reference value for $U_{dc\ ref}$. The difference between $U_{dc}$ and $U_{dc\ ref}$ is proportional to the change of current sourced to or withdrawn from the capacitance at the DC link 152 needed to maintain DC link 152 voltage at $U_{dc\ ref}$. Furthermore this current sourced to or withdrawn from the capacitance at the DC link 152 represents the real component of output current to the grid from Grid Inverter 154.

The output of Error Detector 506 is fed to each input of Multipliers 510 and the outputs of each Multiplier 510 become reference currents for each of Error Detectors 512. The other input to each Multiplier 510 is a sine wave at the grid frequency (as established by samples of Ugrid), having unity amplitude and at respective phase angles of $\phi$, $\phi-120$ ($2\pi/3$) and $\phi-240$ ($4\pi/3$) degrees, where the $2\pi/3$ and $4\pi/3$ phase shifts are provided by Adder 508 and Adder 509. Phase angle $\phi$ is found in Current Reference Generator 526 by finding the angle whose tangent is real power output of Grid Inverter 154 divided by any reactive power from Grid Inverter 154. Real and Reactive power output, if any, are determined in block power sensor 530. As in the case of reactive power suppression from Stator 113, reactive power from the Grid Inverter 154 is suppressed with reactive power feedback from the output of Grid Inverter 154.

Outputs of each Multiplier 510 become reference currents for each of Error Detectors 512. These reference currents are compared to corresponding output currents I_grid Inverter1, I_grid Inverter2 and I_grid Inverter3 and any error is fed to Controllers 514. In a preferred embodiment, Controllers 514 are each conventional PI Controllers but in an alternate embodiment are Resonance PI controllers as discussed above in the case of the Rotor Inverter Controller 400. It is noted however in the case of DC Link and Grid Inverter Controller 500 the application of a Resonance PI controller is simpler because Inverter 154 preferably operates at a fixed frequency of the grid. In an alternate embodiment where individual phase current control is not required, vector control techniques with their associated coordinate transformations can be used to control Grid Inverter 154.

Figure 8:
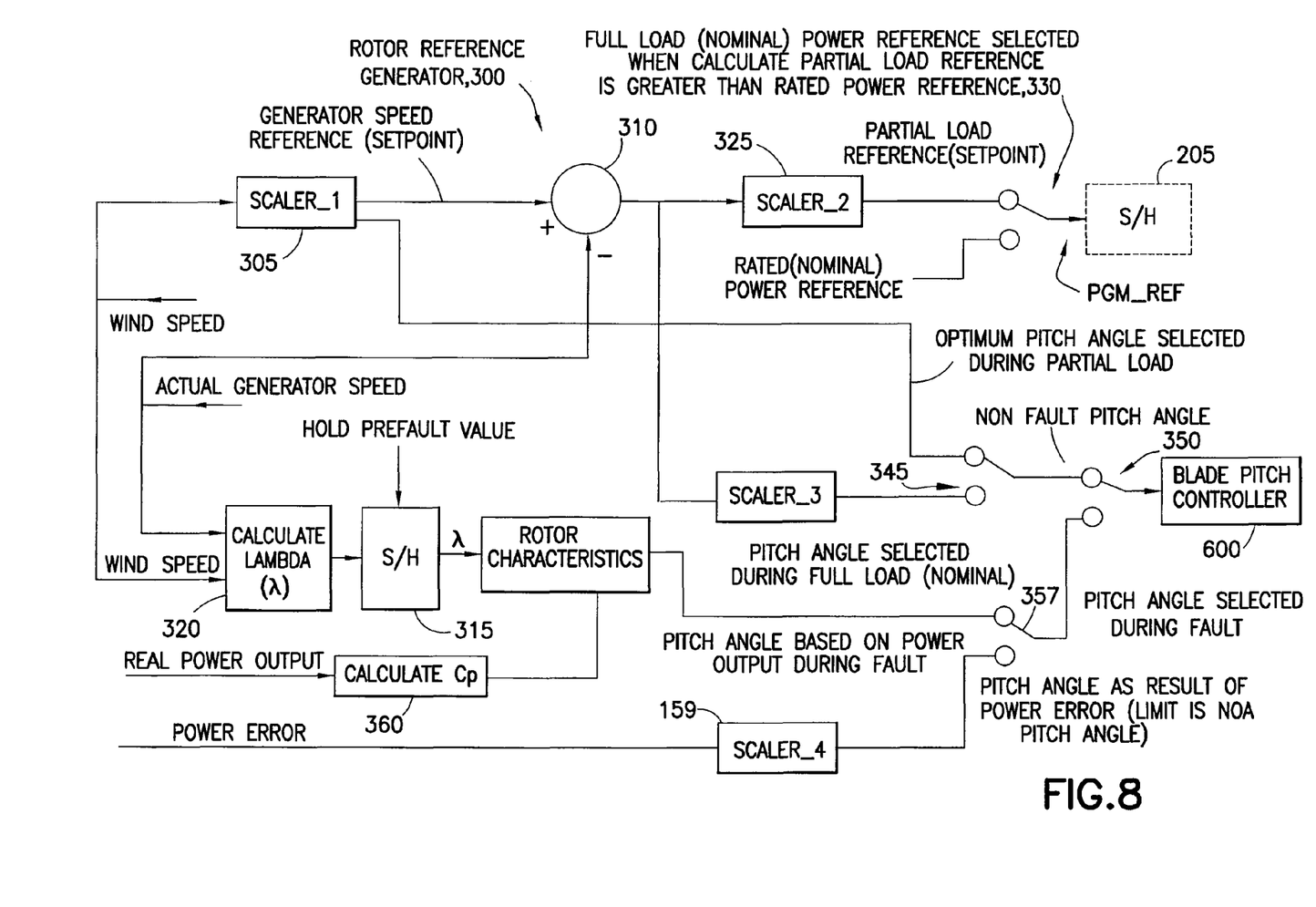
FIG. 8 illustrates a block diagram of the Rotor Reference Generator of the Present Invention.

Referring to FIG. 8, Rotor Reference Generator 300 provides blade pitch angle under partial load, full load as well as high wind speed and fault conditions. Rotor Reference Generator 300 receives a wind speed signal, a generator shaft speed signal, output power signal, a power error signal and outputs a power reference level and blade pitch angle signals. The generator shaft rotational speed is proportional to the speed of Rotor 112 by virtue of a Gearbox (not shown) that steps up the rotor rotational speed to that needed by Generator 110. Rotor Reference Generator Block 300 also receives a logic level from Low Voltage Fault Detector 265 of FIG. 6 when a low voltage fault occurs and pre-fault values are to be held through a fault up to the point of normal operation. occurs and pre-fault values are to be held though a fault up to the point of normal operation.

Referring to FIG. 8, a wind speed signal is input to Scaler_1 305 which outputs an optimum generator speed (generator speed reference (setpoint)) for the given input wind speed and blade pitch angle. This optimum generator speed signal is compared to the actual generator speed in Error Detector 310 and the difference is modified by Scaler_2 325 to represent a partial load reference (set point). This is the power level that the wind turbine would have to provide to keep the actual generator speed equal to the reference generator speed for a particular wind speed.

The partial load reference power level is fed to Switch 330 that selects either a partial load reference value or a rated (nominal) power reference level. The value is selected based on whether the calculated value of reference power is greater than the rated power reference. Stated differently, if the power level based on the wind speed is equal to or greater than the rated (nominal) power, then Switch 330 selects the rated power value since the value based on wind speed would exceed turbine ratings. The output of Switch 330 which is termed PGM_Ref feeds Sample and Hold (S/H) 205 (shown in shadow in this FIG. 8).

As illustrated in FIG. 8, the actual generator speed signal along with the wind speed signal also feeds Calculate Lambda Block 320 where a lambda is continuously calculated. The output of Calculate Lambda Block 320 feeds Sample and Hold (S/H) 315 which continuously passes the lambda value until a hold command is received from Low Voltage Fault Detector 265 of FIG. 6.

The held pre-fault value of lambda along with a value of cp calculated in Calculate Block 360 is used with prestored index tables that present the information in FIG. 2. These tables are entered with lambda and calculated cp to yield a blade pitch angle that will extract from the wind just enough power to provide the output power required by the grid (from Power Sensor 420 in FIG. 6) at any particular point in the fault cycle. The result is that the rotor of Turbine 10 can continue spinning at its prefault value even though output power is below power called for by PGM_ref before the fault.

The blade pitch angle thus calculated is fed to switch 357 along with a blade pitch angle determined from Power Error from FIG. 6 as scaled by Scaler 4 159 of FIG. 8. The blade pitch angle from Scaler 4 159 is compared with the blade Pitch angle based on output power during a fault and the lower of the two is fed to switch 350.

The fault blade pitch angle is fed to Switch 350 which selects either pitch angles under fault conditions or under non fault conditions. Likewise the non fault values are selected by Switch 345 which selects between an optimum blade pitch angle (based on wind speed only) during partial load as shown in FIG. 2 or a blade pitch angle during rated load where the load is fixed and the speed of the blade is controlled to below over speed conditions. The selected angle is labeled as Blade Pitch Reference and fed to Pitch Controller 600 shown in FIG. 8.

Figure 9:
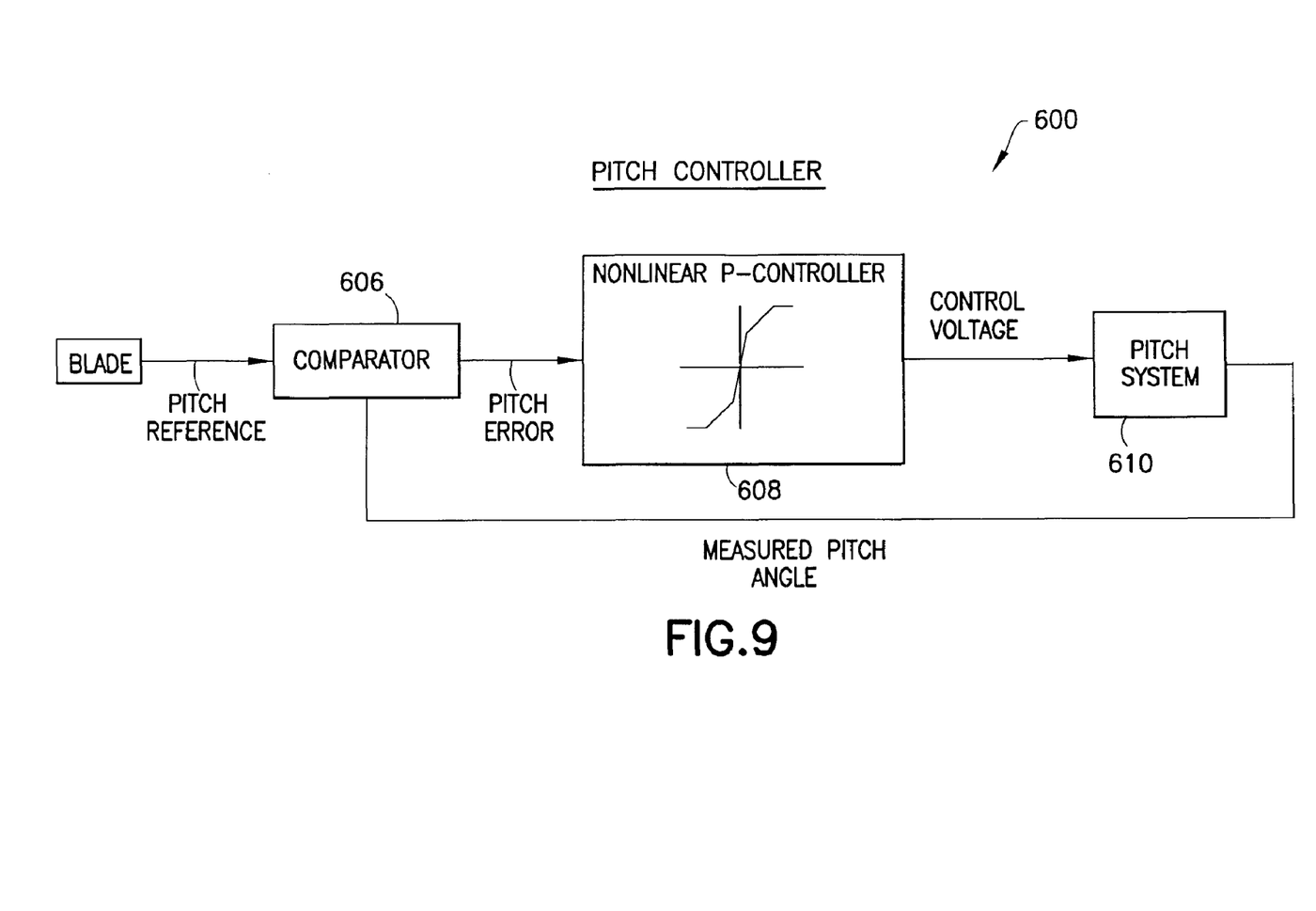
FIG. 9 illustrates a block diagram of one implementation for the Pitch Controller of the present invention.

FIG. 9 illustrates a block diagram of one implementation for the Pitch Controller 600, which provides blade pitch angle control under partial load, full load, high wind speed or fault conditions. The Pitch Controller 600 includes Comparator 606 that compares the Blade Pitch Reference signal from Rotor Reference Generator 300 and a measured pitch angle from Pitch System 610 to determine a pitch error.

A non-linear P Controller 608 provides a control voltage to the Pitch System 610 based on the pitch error. Pitch System 610 connects with one of the Wind Blades 25 and includes components to control the pitch of the wind blade. For example, Pitch System 610 may include a hydraulic system where the control voltage is applied to a proportional value that generates a hydraulic flow moving a pitch cylinder that controls the pitch of a wind turbine blade. The pitch position is monitored by the displacement of the cylinder and feedback to Comparator 606.

Thus, the invention in its most preferred form provides for a lightweight variable speed wind turbine, preferably as part of a wind park, which turbine is capable of staying on line while maintaining blade pitch control through low voltage events and supplying active power from a stator and rotor at unity power factor using scalar power control. Furthermore, while there has been illustrated and described what are at present considered to be exemplary implementations and methods of the present invention, various changes and modifications may be made, and equivalents may be substituted for elements thereof, without departing from the true scope of the invention. In particular, modifications may be made to adapt a particular element, technique, or implementation to the teachings of the present invention without departing from the spirit of the invention.

Likewise, while the present invention uses wind power as a prime mover to rotate an electric generator, alternate embodiments of the invention may use other alternative energy resources that have erratic energy output to likewise turn an electrical generator, including, but not limited to, such power sources as tidal stream, wave power and solar thermal energy.

In addition, while the described implementations include hardware embodiments, which may run software to perform the methods described herein, the invention may also be implemented in hardware or software alone. Accordingly, the software can be embodied in a machine-readable medium such as, for example, a random access memory (RAM), read-only memory (ROM), compact disc (CD) memory, non-volatile flash memory, fixed disk, and other like memory devices. Furthermore, the processors and controllers described herein can execute the software to perform the methods described above. Other embodiments of the invention will be apparent from consideration of the specification and practice of the invention disclosed herein. Therefore, it is intended that the specification and examples be considered as exemplary only, with a true scope and spirit of the invention being indicated by the following claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A variable speed wind turbine adapted to operate in a wind farm, said turbine being adapted to supply electrical power to an associated grid at a substantially fixed grid frequency during a low voltage condition, the turbine comprising a stator and a doubly-fed generator having a rotor adapted to turn at a rotor speed, the rotor and stator each comprising polyphase windings; the variable speed turbine comprising:
   a rotor inverter;
   a grid inverter;

a rotor inverter controller for using scalar controls to control the rotor inverter to provide stator output power at a frequency substantially equal to a grid frequency and at unity power factor;

a link for maintaining a substantially constant DC interface between the rotor inverter and the grid inverter;

a grid inverter controller for using scalar controls to independently control individual grid inverter currents and provide output power at a frequency substantially equal to the grid frequency and at unity power factor;

blade control means for maintaining a generator rotor speed at substantially the same speed before and during a low voltage condition; and protection means for the link and rotor for limiting damage to turbine components during a fault.

2. A variable speed wind turbine according to claim 1, wherein the turbine is operated in a wind farm that produces substantially all reactive power needs of the grid.

3. A variable speed wind turbine according to claim 1, wherein the scalar control utilizes a Resonance Proportional-Integral Controller.

4. A variable speed wind turbine according to claim 1, wherein blade control means comprises pitch control means.

5. A method for operating a variable speed wind turbine in a wind farm, said turbine being adapted to supply electrical power to an associated grid at a substantially fixed grid frequency during a low voltage condition, the turbine comprising a stator and a doubly-fed generator having a rotor adapted to turn at a rotor speed, the rotor and stator each comprising polyphase windings; the method comprising the steps of:

applying scalar controls to control a rotor inverter so as to provide stator output power at a frequency substantially equal to a grid frequency and at unity power factor;

maintaining a substantially constant DC interface between the rotor inverter and a grid inverter;

applying scalar controls to independently control individual grid inverter currents and provide output power at a frequency substantially equal to the grid frequency and at unity power factor; and applying blade control means for maintaining a generator rotor speed at substantially the same speed before and during a low voltage condition.

* * * * *

UNITED STATES PATENT AND TRADEMARK OFFICE
CERTIFICATE OF CORRECTION

| | | |
|---|---|---|
| PATENT NO. | : 8,198,742 B2 | Page 1 of 1 |
| APPLICATION NO. | : 12/336219 | |
| DATED | : June 12, 2012 | |
| INVENTOR(S) | : Jørgensen et al. | |

It is certified that error appears in the above-identified patent and that said Letters Patent is hereby corrected as shown below:

In Detailed Description of the Presently Preferred Embodiments:

Column 12, Lines 62-63, please delete "occurs and pre-fault values are to be held though a fault up to the point of normal operation.".

Signed and Sealed this
Fourth Day of December, 2012

David J. Kappos
*Director of the United States Patent and Trademark Office*